US009917730B2

(12) United States Patent
Subramanian et al.

(10) Patent No.: US 9,917,730 B2
(45) Date of Patent: Mar. 13, 2018

(54) PEER-TO-PEER WIRELESS CONTROLLER TOPOLOGY PROVISIONING SYSTEM

(71) Applicant: Dell Products L.P., Round Rock, TX (US)

(72) Inventors: Krishnamurthy Subramanian, Saratoga, CA (US); Sanjay Sane, Fremont, CA (US); Christopher Stephen Petrick, Cedar Park, TX (US)

(73) Assignee: Dell Products L.P., Round Rock, TX (US)

( * ) Notice: Subject to any disclaimer, the term of this patent is extended or adjusted under 35 U.S.C. 154(b) by 113 days.

(21) Appl. No.: 14/981,156

(22) Filed: Dec. 28, 2015

(65) Prior Publication Data
US 2017/0187574 A1    Jun. 29, 2017

(51) Int. Cl.
*H04L 12/24* (2006.01)
*H04L 29/08* (2006.01)
*H04W 8/00* (2009.01)

(52) U.S. Cl.
CPC .......... *H04L 41/0806* (2013.01); *H04L 41/12* (2013.01); *H04L 67/104* (2013.01); *H04W 8/005* (2013.01)

(58) Field of Classification Search
CPC .................................................. H04L 41/0806
See application file for complete search history.

(56) References Cited

U.S. PATENT DOCUMENTS

| 5,959,999 A * | 9/1999 | An | H04B 7/2123 370/442 |
| 6,934,752 B1 * | 8/2005 | Gubbi | H04L 47/70 370/392 |
| 8,787,350 B2 * | 7/2014 | Joshi | H04L 45/00 370/229 |

(Continued)

OTHER PUBLICATIONS

Benkic, K.; Malajner, M.; Planinsic, P. and Cucej, Z., "IEEE Xplore Abstract—Using RSSI Value for Distance Estimation in Wireless Sensor Networks Based on ZigBee, Using RSSI Value for Distance Estimation in Wireless Sensor Networks Based on ZigBee," 2016, pp. 1-2, IEEE.

*Primary Examiner* — John Blanton
(74) *Attorney, Agent, or Firm* — Haynes and Boone, LLP

(57) ABSTRACT

A peer-to-peer wireless controller topology provisioning system includes plurality of networking devices. A plurality of peer-to-peer wireless controllers are included in each networking device and are each configured to control a portion of a single wireless link with another peer-to-peer wireless controller. A management subsystem determines relative locations for each of the networking devices, and a number of peer-to-peer wireless controllers available in each of the networking devices. The management subsystem then uses a maximum hop constraint and a minimum bandwidth constraint to generate a peer-to-peer wireless controller topology for at least some of the peer-to-peer wireless controllers that are available in the networking devices. The management subsystem then provides the peer-to-peer wireless controller topology to each of the networking devices to (Continued)

cause each of the networking devices to configure their available peer-to-peer wireless controllers to provide wireless links according to the peer-to-peer wireless controller topology.

20 Claims, 10 Drawing Sheets

(56) References Cited

U.S. PATENT DOCUMENTS

| | | | | |
|---|---|---|---|---|
| 2007/0253341 A1* | 11/2007 | Atkinson | ............... | H04L 45/02 370/252 |
| 2012/0163171 A1* | 6/2012 | Lee | ............. | H04W 40/12 370/231 |
| 2013/0294285 A1* | 11/2013 | Zhang | .............. | H04W 24/02 370/254 |
| 2015/0003296 A1* | 1/2015 | Fan | ............. | H04L 41/0806 370/255 |

* cited by examiner

PEER-TO-PEER WIRELESS CONTROLLER TOPOLOGY PROVISIONING SYSTEM

BACKGROUND

The present disclosure relates generally to information handling systems, and more particularly to topology provisioning system for peer-to-peer wireless controllers in an information handling system network.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Some information handling systems such as, for example, switches, servers, and storage devices, are sometimes positioned in racks and connected together in order to provide a datacenter. For example, a plurality of servers may be positioned in a rack connected to a Top Of Rack (TOR) switch that is connected to a network, and the TOR switch may route data from the network and to the servers, from the servers and to the network, as well as between different components in the rack. The TOR switches are typically connected together using conventional cabling such as, for example, Ethernet cables that are configured to transmit data between the TOR switches. However, because many racks may be included in a datacenter, the connection of the TOR switches requires many cables that must be routed through the datacenter, and that cabling can become cumbersome, obstructing access to the TOR switches, servers, and/or other components. It is desirable to eliminate the use of conventional cables in connecting TOR switches in a datacenter, but the use of wireless communication raises a number of issues. For example, there is no conventional methods for dynamically providing and modifying a wireless topology that utilizes peer-to-peer wireless controllers (e.g., pairs of wireless controllers that control a single wireless link between each other) in TOR switches of a datacenter that optimizes available bandwidth while reducing data communication latency.

Accordingly, it would be desirable to provide a topology provisioning system for peer-to-peer wireless controllers in an information handling system network.

SUMMARY

According to one embodiment, an information handling system (IHS) includes a communication system; a processing system that is coupled to the communication system; and a memory system that is coupled to the processing system and that includes instruction that, when executed by the processing system, cause the processing system to provide a topology provisioning engine that is configured to: determine relative locations for each of a plurality of networking devices that are coupled to the communication system; determine a number of peer-to-peer wireless controllers available in each of the plurality of networking devices, wherein each of the peer-to-peer wireless controllers are configured to control a portion of a single wireless link with another peer-to-peer wireless controller; generate a peer-to-peer wireless controller topology for at least some of the peer-to-peer wireless controllers that are available in the plurality of networking devices using a maximum hop constraint and a minimum bandwidth constraint; and provide the peer-to-peer wireless controller topology through the communication system to each of the plurality of networking devices, wherein wireless topology is configured to cause each of the plurality of networking devices to configure their available peer-to-peer wireless controllers to provide wireless links according to the peer-to-peer wireless controller topology.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
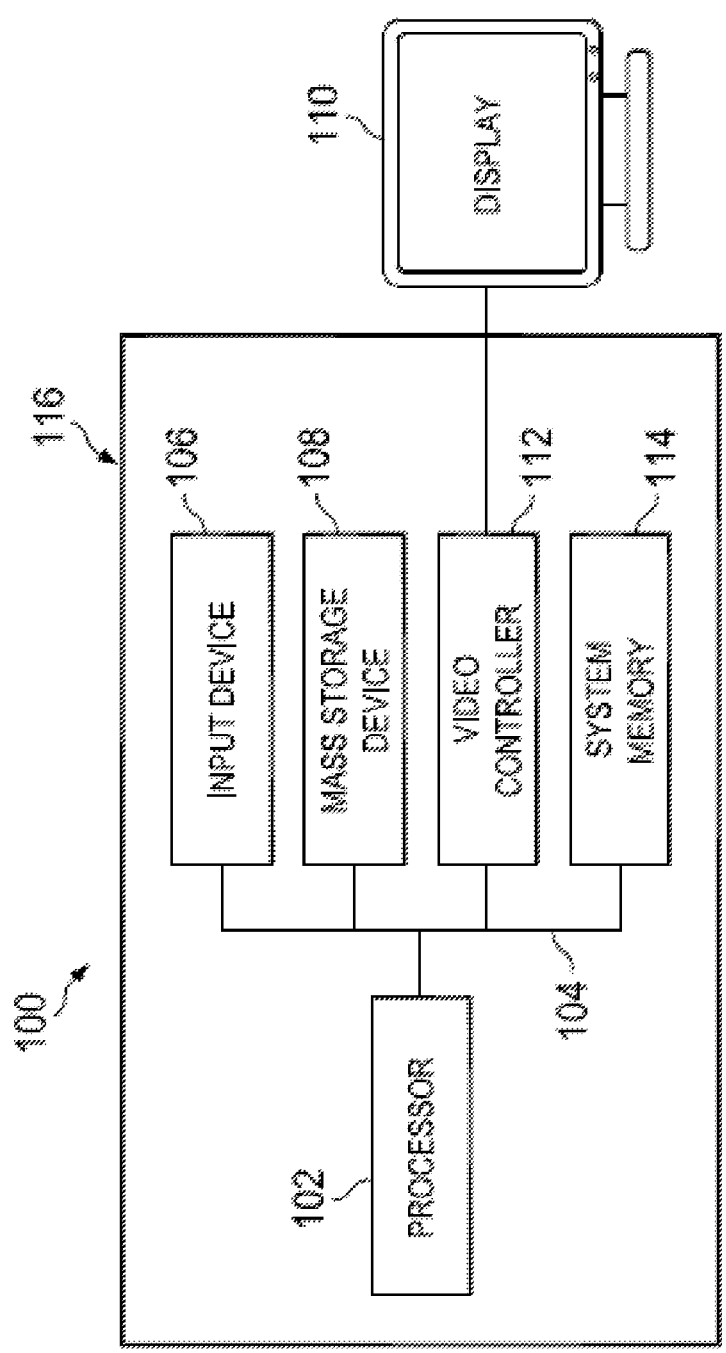
FIG. 1 is a schematic view illustrating an embodiment of an information handling system.

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
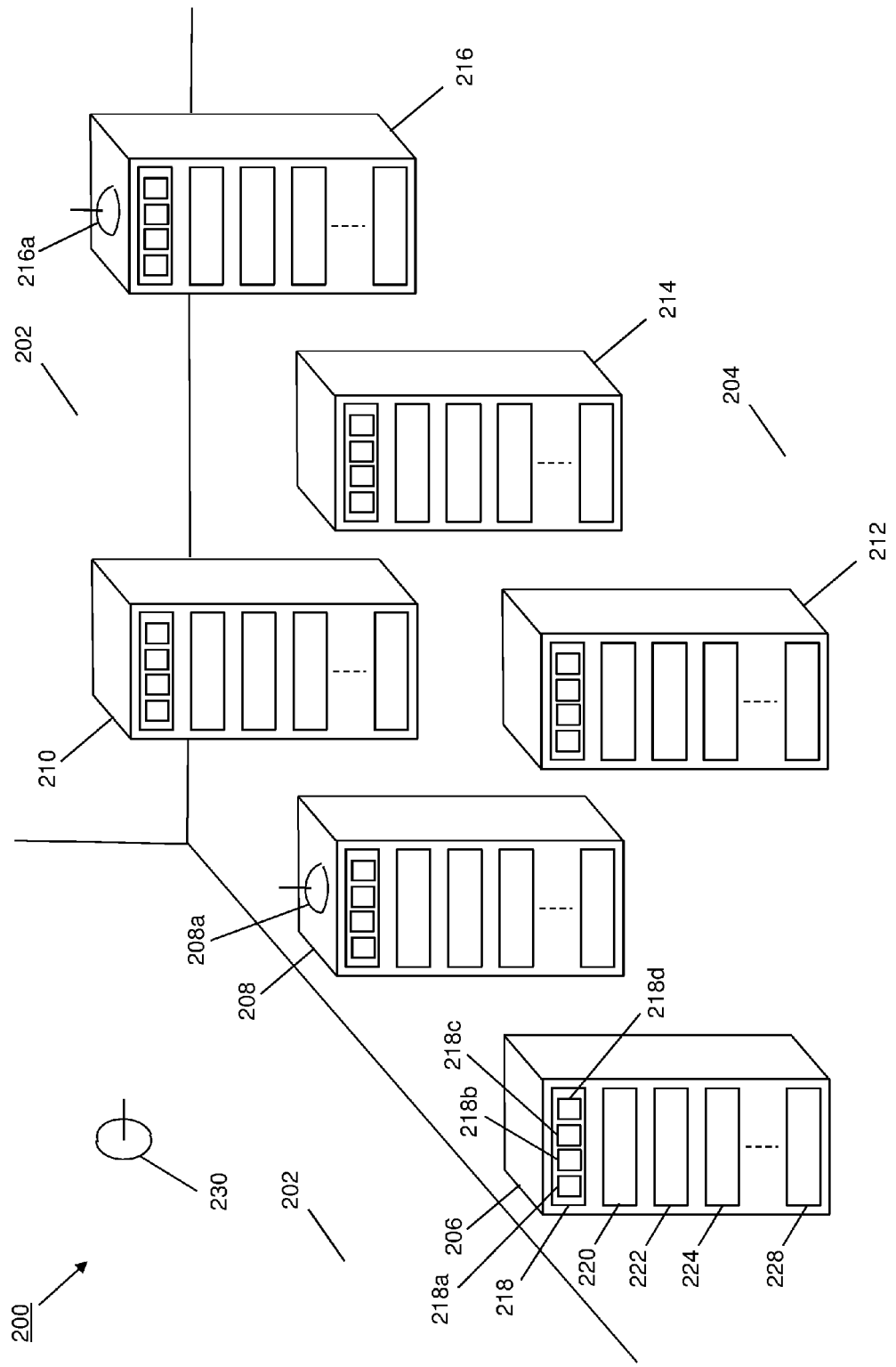
FIG. 2 is a perspective view illustrating an embodiment of a peer-to-peer wireless controller topology provisioning system.

Referring now to FIG. 2, an embodiment of a peer-to-peer wireless controller topology provisioning system 200 is illustrated. In the embodiment illustrated and discussed below, the peer-to-peer wireless controller topology provisioning system 200 is described as implemented in a datacenter, but one of skill in the art in possession of the present disclosure will recognize that the peer-to-peer wireless controller topology provisioning system 200 will provide benefits in other wireless networking environments that will fall within the scope of the present disclosure. In the illustrated embodiment, the peer-to-peer wireless controller topology provisioning system 200 located in a room including a plurality of walls 202, a floor 204, and a ceiling (not illustrated, but extending between the plurality of walls 202 opposite the floor 204). A plurality of racks 206, 208, 210, 212, 214, and 216 are positioned on the floor 204 of the room. While only six racks are illustrated, one of skill in the art in possession of the present disclosure will recognize that many more racks may (and typically will) be provided in a datacenter. The devices positioned in the rack 206 will now be described, and it should be understood that similar devices may positioned in the racks 208-216.

A networking device 218 is located in the rack 206. In an embodiment, the networking device 218 may be the IHS 100 discussed above with reference to FIG. 1 and/or may include some or all of the components of the IHS 100. For example, in the embodiments illustrated and discussed below, the networking device 218 is a Top Of Rack (TOR) switch that is configured to couple to devices in the rack 206 as well as other TOR switches and networking devices in the datacenter. However, one of skill in the art in possession of the present disclosure will recognize that other types of networking devices will benefit from the teachings of the present disclosure and thus will fall within its scope. The networking device 218 includes a plurality of peer-to-peer wireless controllers 218a, 218b, 218c, and up to 218d, which are discussed in further detail below. While only four peer-to-peer wireless controllers are illustrated, one of skill in the art in possession of the present disclosure will recognize that many more peer-to-peer wireless controllers may (and typically will) be provided in the networking devices. A plurality of computing devices 220, 222, 224, and up to 226 are located in the rack 206. In an embodiment, any or all of the computing devices 220-228 may be the IHS 100 discussed above with reference to FIG. 1 and/or may include some or all of the components of the IHS 100. For example, in the embodiments illustrated and discussed below, the computing devices 220-228 are servers that are configured to couple to the TOR switch in their respective racks. However, one of skill in the art in possession of the present disclosure will recognize that other types of devices (e.g., storage devices) will benefit from the teachings of the present disclosure and thus will fall within its scope. Furthermore, while only four devices are illustrated, one of skill in the art in possession of the present disclosure will recognize that many more devices may (and typically will) be provided in a rack.

The peer-to-peer wireless controller topology provisioning system 200 also illustrates a few optional features that may be provided in different embodiments. For example, each of the rack 208 and the rack 216 includes a respective antenna system 208a and 216a that is located on a top surface of that rack. Furthermore, an antenna system 230 is located on one of the walls 202. As discussed in further detail below, in some embodiments, the antenna systems 208a, 216a, and 230 may be utilized in providing the wireless communications between peer-to-peer wireless controllers. While a few antenna systems are illustrated, one of skill in the art in possession of the present disclosure will recognize that additional antenna systems may be provided on other racks, walls, the floor 204, the ceiling, and/or at any other locations in the peer-to-peer wireless controller topology provisioning system 200 in order to enable the wireless communications discussed below.

Figure 3:
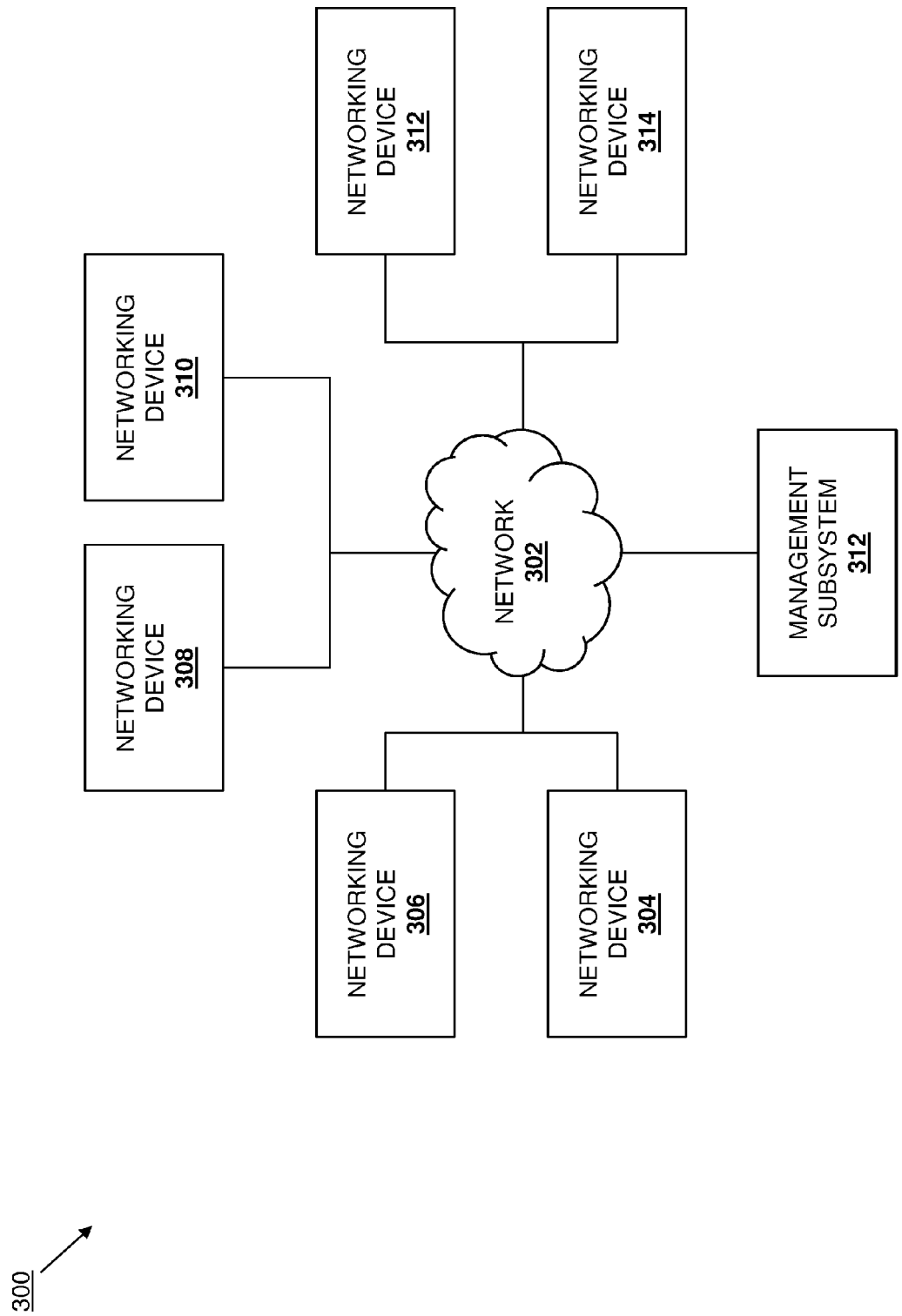
FIG. 3 is a schematic view illustrating an embodiment of the peer-to-peer wireless controller topology provisioning system of FIG. 2.

Referring now to FIG. 3, an embodiment of a peer-to-peer wireless controller topology provisioning system 300 is illustrated. In an embodiment, the peer-to-peer wireless controller topology provisioning system 300 may be the peer-to-peer wireless controller topology provisioning system 200 discussed above with reference to FIG. 2. In the illustrated embodiment, the peer-to-peer wireless controller topology provisioning system 300 includes a network 302. A plurality of networking device 304, 306, 308, 310, 312, and 318 are coupled to the network 302, each of which may correspond to a respective one of the networking devices in the racks 206-216 discussed above with reference to FIG. 2. As such, any of the networking devices 304-314 may be the IHS 100 of FIG. 1 and/or include some or all of the components of the IHS 100, and in specific examples may be TOR switches as discussed above. Only six networking devices 304-314 are illustrated for clarity, and in some embodiments discussed below the networking devices 304-314 may represent each of the respective networking devices in the racks 206-216 of FIG. 2. While not illustrated, in some embodiments, the devices (e.g., the device 220-228) in the racks 206-216 of FIG. 2 may be coupled to the network 302 as well.

A management subsystem 316 is coupled to the network 302. In an embodiment, the management subsystem 316 may be provided in a management device (not illustrated in FIG. 2 or 3) that is separate from the networking devices and other devices in the racks 206-216 of FIG. 2 and coupled to the networking devices (and in some embodiments, the other devices in the racks 206-216) via the network 302. However, in other embodiments, the management subsystem 312 may be provided in one or more of the networking devices and/or other devices in the racks 206-216 while remaining within the scope of the present disclosure. In some embodiments, the management subsystem 312 may provide a Path Computation Element (PCE) that is configured to determine the peer-to-peer wireless topologies discussed below. In some embodiments, the network 302 may be an out-of-band management network that is distinct from a wireless network provided between the networking devices 304-314 and/or the other devices in the racks 206-216. However, one of skill in the art in possession of the present disclosure will recognize that a wide variety of networks may be provided as the network 302 while remaining within the scope of the present disclosure.

Figure 4:
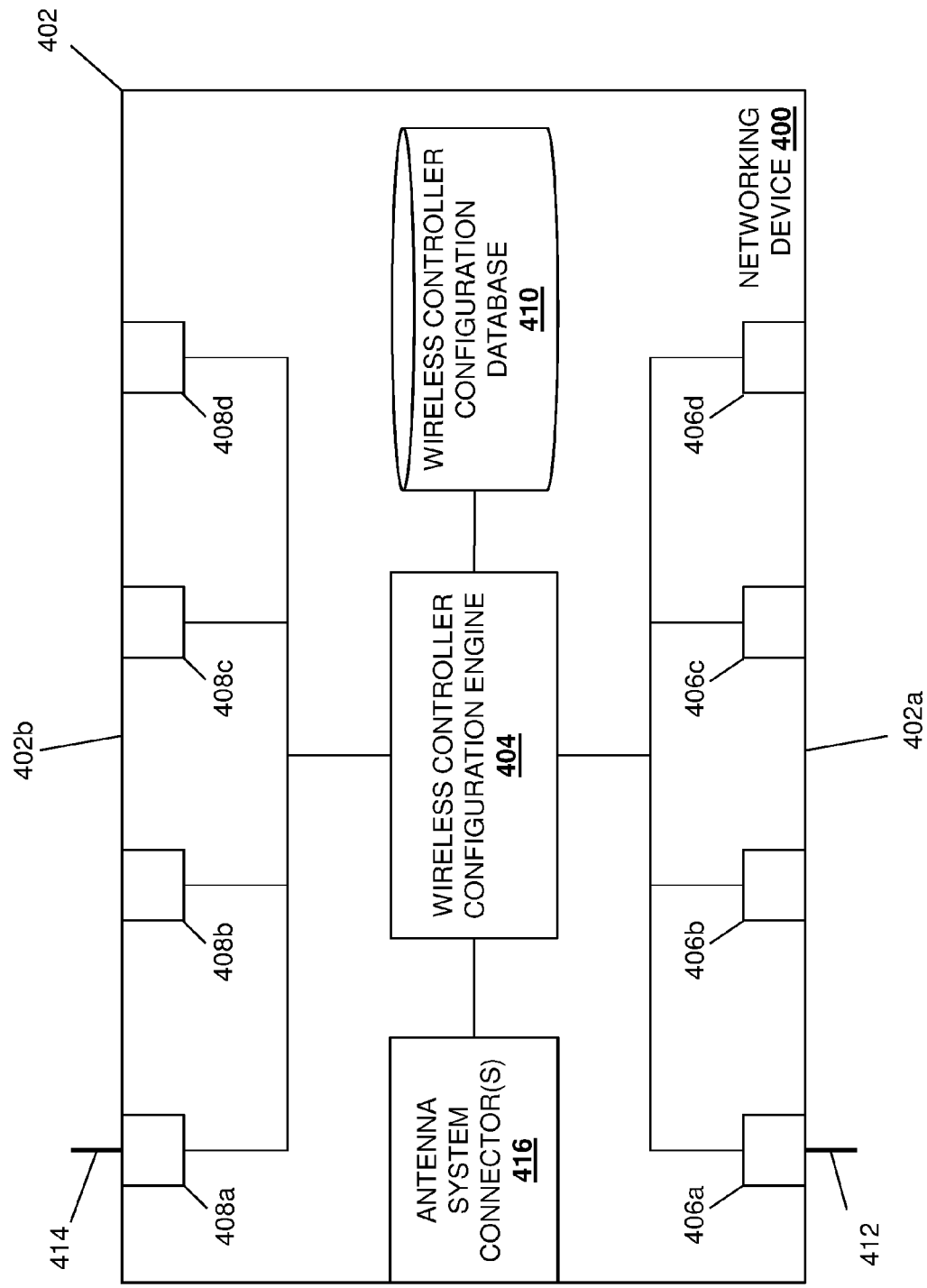
FIG. 4 is a schematic view illustrating an embodiment of a networking device used in the peer-to-peer wireless controller topology provisioning system of FIGS. 2 and 3.

Referring now to FIG. 4, an embodiment of a networking device 400 is illustrated. In an embodiment, the networking device 400 may be any of the networking devices 218 and 304-314 discussed above. As such, the networking device 400 may be the IHS 100 of FIG. 1 and/or include some or all of the components of the IHS 100, and in specific examples may be a TOR switch as discussed above. However, other networking devices are envisioned as falling within the scope of the present disclosure. The networking device 400 includes a chassis 402 that houses the components of the networking device 400, only some of which are illustrated for clarity. The chassis 402 may house a processing system (not illustrated, but which may include the processor 102 discussed above with reference to FIG. 1) and a memory system (not illustrated, but which may include the system memory 114 discussed above with reference to FIG. 1) that includes instructions that, when executed by the processing system, cause the processing system to provide a wireless controller configuration engine 404 that is configured to perform the functions of the wireless controller configuration engines and networking devices discussed below.

The chassis 402 also houses (or at least partially houses) a plurality of peer-to-peer wireless controllers 406a, 406b, 406c, 406d, 408a, 408b, 408c, and up to 408d that are coupled to the wireless controller configuration engine 404 (e.g., via coupling(s) between the processing system and the peer-to-peer wireless controllers 406a, 406b, 406c, 406d, 408a, 408b, 408c, and up to 408d). In the illustrated embodiment, the peer-to-peer wireless controllers 406a, 406b, 406c, and up to 406d are accessible on a first surface 402a of the chassis 402, while the peer-to-peer wireless controllers 408a, 408b, 408c, and up to 408d are accessible on a second surface 402b of the chassis 402 that is located opposite the chassis 402 from the first surface 402a. For example, the peer-to-peer wireless controllers 406a, 406b, 406c, and up to 406d may correspond to the peer-to-peer wireless controllers 218a, 218b, 218c, and up to 218d illustrated in FIG. 2, while the peer-to-peer wireless controllers 408a, 408b, 408c, and up to 408d are not visible in FIG. 2 but face the direction of the rack 208. However, one of skill in the art in possession of the present disclosure will recognize that other configurations of the peer-to-peer wireless controllers on the networking device 400 will fall within the scope of the present disclosure.

In an embodiment, each of the peer-to-peer wireless controllers may be wireless peer-to-peer PHYs that include circuitry to implement the wireless peer-to-peer physical layer functions discussed below by allowing high-bitrate communication by narrowing the wireless beam provided only between line-of-sight peers. For example, each wireless peer-to-peer PHY may be configured to establish and control a portion of a single, line-of-sight wireless link with another wireless peer-to-peer PHY that operates to establish and control the remaining portion of that single, line-of-sight wireless link. Such peer-to-peer wireless controllers may be provided in a wireless networking system in order to provide dedicated links between their respective devices that include the pair of peer-to-peer wireless controllers in order to, for example, allow for relatively high communication bandwidths on that dedicated link and/or provide other benefits known in the art. As discussed below, any or all of the racks (e.g., the rack 218) may include openings or may otherwise be free of obstructions such that peer-to-peer wireless controllers (e.g., the peer-to-peer wireless controllers 408a, 408b, 408c, and up to 408d) have a line-of-sight to the peer-to-peer wireless controllers on a networking device in another rack (e.g., the networking device in the rack 208). While a specific type of peer-to-peer wireless controller is described herein, other peer-to-peer wireless controllers are envisioned as falling within the scope of the present disclosure.

The chassis 402 may also house a storage system (not illustrated, but which may include the storage device 108 discussed above with reference to FIG. 1) that is coupled to the wireless controller configuration engine 404 (e.g., via a coupling between the processing system and the storage system) that includes a wireless controller configuration database 410 that stores wireless controller configuration information that, as discussed below, may include wireless controller information about the peer-to-peer wireless controllers in the networking device and/or a variety of other wireless controller configuration information known in the art. The wireless controller configuration information stored in the wireless controller configuration database 410 may be provided by a network administrator, retrieved by the wireless controller configuration engine 404, and/or other populated in the wireless controller configuration database 410 in a variety of manners that will fall within the scope of the present disclosure.

In the illustrated embodiment, the peer-to-peer wireless controller 406a includes or is coupled to an antenna 412 that extends from the first surface 402a of the chassis 402, and the peer-to-peer wireless controller 408a includes or is coupled to an antenna 414 that extends from the second surface 402b of the chassis 402. The antennas 412 and 414 are provided in the illustrated embodiment as an example of one configuration of the peer-to-peer wireless controllers that allows the peer-to-peer wireless controllers to communicate wirelessly with other peer-to-peer wireless controllers in the peer-to-peer wireless controller topology provisioning system 200, and one of skill in the art in possession of the present disclosure will recognize that any or all of the peer-to-peer wireless controllers may be coupled to or include similar antennas. However, in other embodiments, the chassis 402 may house one or more antenna system connectors 416 that are configured to couple to an antenna system that may be used by the peer-to-peer wireless controllers to communicate wirelessly with other peer-to-peer wireless controllers in the peer-to-peer wireless controller topology provisioning system 200. For example, the antenna system connector(s) 416 may provide a connection to an antenna system that extends from a surface of the chassis 402 of the networking device 400. In another example, the antenna system connector(s) 416 may provide a connection to an antenna system that is located on or adjacent a rack that houses the networking device 400 (e.g., the antenna systems 208a and/or 216a discussed above with reference to FIG. 2). While the antenna system connector(s) 416 are illustrated as coupled to the peer-to-peer wireless controllers through the wireless controller configuration engine 404 (e.g., via a coupling between the processing system and the antenna system connector(s) 416), the antenna system connector(s) 416 may be coupled directly to the peer-to-peer wireless controllers while remaining within the scope of the present disclosure. Furthermore, while a few examples have been provided of subsystems for allowing the wireless communication of the peer-to-peer wireless controllers, one of skill in the art in possession of the present disclosure will recognize that other subsystems for doing so will fall within the scope of the present disclosure.

Figure 5:
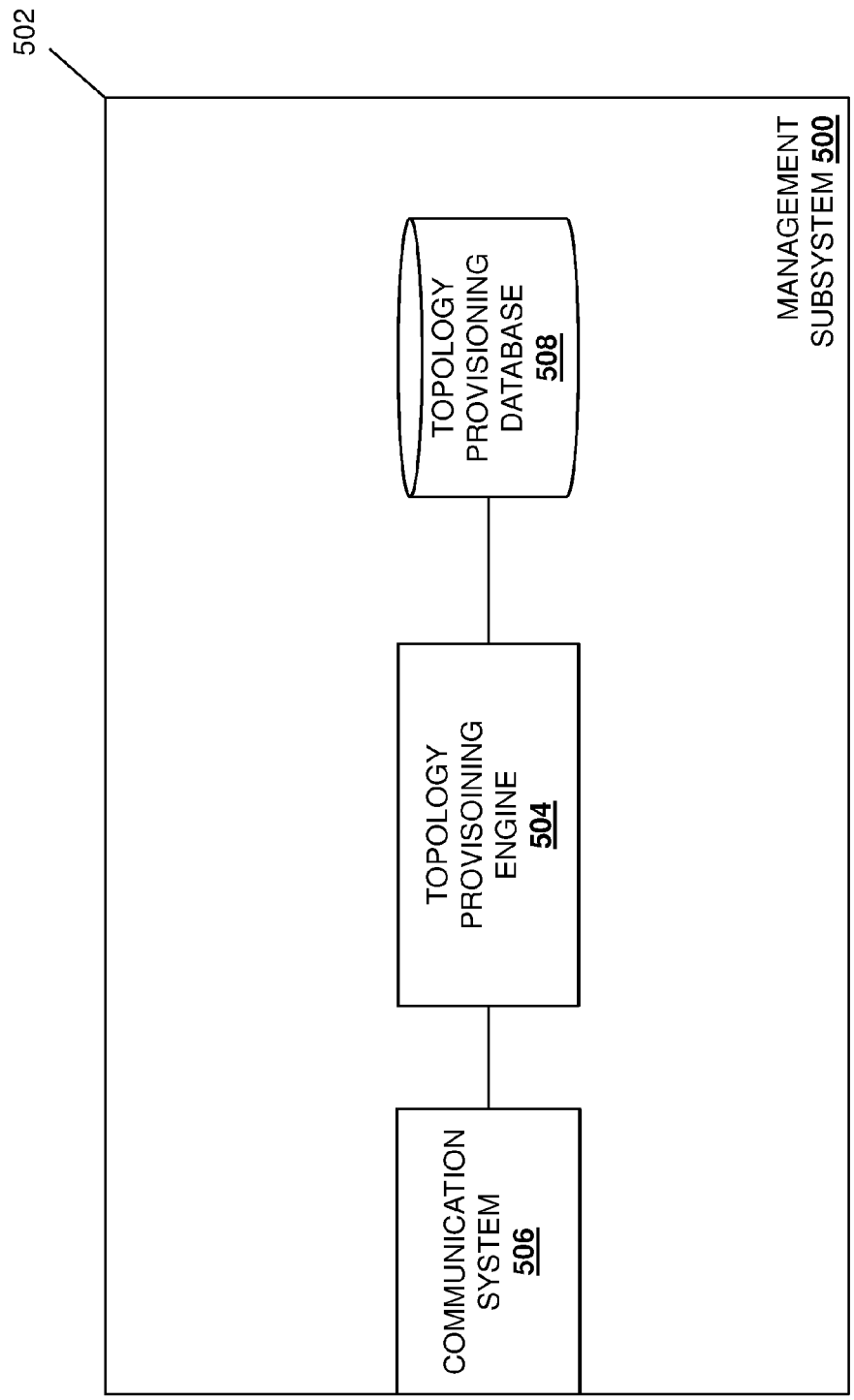
FIG. 5 is a schematic view illustrating an embodiment of a management subsystem used in the peer-to-peer wireless controller topology provisioning system of FIGS. 2 and 3.

Referring now to FIG. 5, an embodiment of a management subsystem 500 is illustrated. As discussed above, the management subsystem 500 may be provided in a management device, in any of the networking devices 218 and 304-314 discussed above, or in any of the other devices in the racks 206-216. As such, in those embodiment, some of the features of the management subsystem 500 may be shared with those devices. The management subsystem 500 includes a chassis 502 that houses the components of the management subsystem 500 (as well as, in some embodiment, components of other devices), only some of which are illustrated for clarity. The chassis 502 may house a processing system (not illustrated, but which may include the processor 102 discussed above with reference to FIG. 1) and a memory system (not illustrated, but which may include the system memory 114 discussed above with reference to FIG. 1) that includes instructions that, when executed by the processing system, cause the processing system to provide a topology provisioning engine 504 that is configured to perform the functions of the topology provisioning engines and management subsystems discussed below. A communication system 506 is coupled to the topology provisioning engine 504 (e.g., via a coupling between the processing system and the communication system 506) and may include a variety of communication systems for allowing the topology provisioning engine 504 to perform the communications discussed below. For example, the communication system 506 may be a network communication system that couples to a network (e.g., the network 302 discussed above with reference to FIG. 2) to allow communications with the networking devices, an inter-chassis communication system that allows communications with wireless controller configuration engines that share a chassis with the management subsystem 500, combinations thereof, and/or a variety of other communication systems that one of skill in the art in possession of the present disclosure would recognize would provide the functionality discussed below.

The chassis 502 may also house a storage system (not illustrated, but which may include the storage device 108 discussed above with reference to FIG. 1) that is coupled to the topology provisioning engine 504 (e.g., via a coupling between the processing system and the storage system) that includes a topology provisioning database 508 that stores topology provisioning information that, as discussed below, may include maximum hop constraints, minimum bandwidth constraints, common number of peer-to-peer wireless controller constraints, bit-error-rate constraints, maximum wireless transmission constraints, wireless controller information for each of the networking devices, and/or a variety of other topology provisioning information known in the art. The topology provisioning information stored in the topology provisioning database 508 may be provided by a network administrator, retrieved by the topology provisioning engine 504, and/or other populated in the topology provisioning database 508 in a variety of manners that will fall within the scope of the present disclosure.

Figure 6:
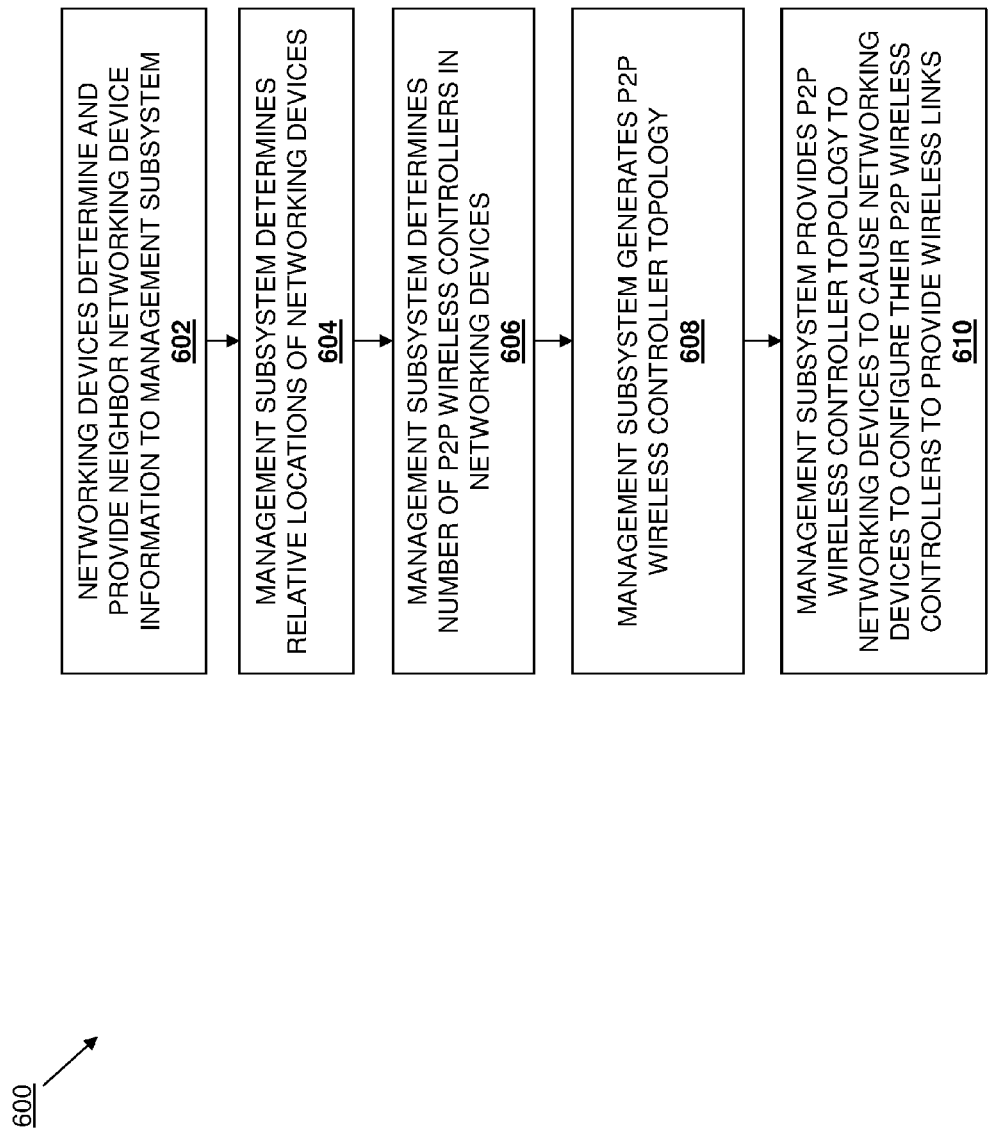
FIG. 6 is a flow chart illustrating a method for determining a wireless topology for peer-to-peer wireless controllers in a network.

Referring now to FIG. 6, an embodiment of a method 600 for providing a peer-to-peer wireless controller topology is illustrated. As discussed below, in some embodiments, the systems and methods of the present disclosure may provide peer-to-peer wireless controllers in networking devices that utilize line-of-sight/point-to-point wireless communications to provide dedicated links with other peer-to-peer controllers in other networking devices, and a management subsystem operates to automatically determine and distribute a layer 1 (L1) wireless topology that provides the lowest possible latency and highest possible bandwidth considering the peer-to-peer wireless controllers that are available in the networking devices. This is accomplished by the management subsystem communicating with the networking device to discover the physical topology of the networking devices and the number of peer-to-peer wireless controllers in each of those networking devices, and determining the available peering possibilities by computing an L1 peer-to-peer wireless controller topology that provides a relatively low number of wireless hops given the communication requirements of the network (thus minimizing latencies) while utilizing as many of the peer-to-peer wireless controllers as possible (thus maximizing bandwidth). The peer-to-peer wireless controller topology may then be distributed to each of the networking devices for use by those networking device in configuring their respective peer-to-peer wireless controllers, antenna systems, and/or other components to realize the L1 peer-to-peer wireless controller topology that provides a plurality of wireless links between the peer-to-peer wireless controllers.

The method 600 begins at block 602 where networking devices determine and provide neighbor networking device information to a management subsystem. In an embodiment, the networking device 218 in the rack 206 of FIG. 2 may operate at block 602 to determine neighbor networking device information about one or more neighboring networking devices (e.g., the networking devices in the racks 208, 210, 212, 214, and/or 216), and provide that neighbor networking device information through the network 302 to the management subsystem 312. While the operation of the networking device 218 is described, it should be recognize that any or all of the networking devices in the racks 206-216 may operate in a similar manner at block 602. For example, at block 602, the wireless controller configuration engine 404 in the networking device 400 may operate to configure a wireless communication subsystem (which may include one or more of the peer-to-peer wireless controllers 406a-d and/or 408a-d) to communicate with a similar wireless communication subsystem on the other networking device(s) to determine the neighbor networking device information. In addition, the wireless controller configuration engine 404 may also operate to control antennas included on the wireless communication system/peer-to-peer wireless controllers (e.g., the antennas 312 and 414) or coupled to the wireless communication system/peer-to-peer wireless controllers (e.g., via the antenna system connectors 416 such as the antenna systems 208a and 216a) in order to scan for neighboring networking devices.

In an embodiment of block 602, the wireless controller configuration database 410 may include thresholds for Received Signal Strength Indicators (RSSI), Link Quality Indication (LQI), and/or other signal strength parameters that may be utilized by the wireless controller configuration engine 404 to determine whether neighboring networking devices are close enough to collect neighbor networking device information. For example, a threshold of −50 decibels may be utilized to determine whether signals received from networking devices in the racks 208-210 indicate that a networking device is sufficiently proximate to the networking device 218 to collect neighbor networking device information. One of skill in the art in possession of the present disclosure will recognize that thresholds for signal strength parameters may be provided to cause the networking device 218 to collect neighbor networking device information from networking devices within a desired proximity of the networking device 218, and may vary depending on desired characteristics of the network, wireless transmission capabilities of the networking devices, and/or other factors that would be apparent to one of skill in the art.

In some embodiments, the determination of neighbor networking device information may be performed using a peer-to-peer wireless controller on a networking device that has a line-of-sight with a peer-to-peer wireless controller on a neighboring networking device. In different examples of that embodiment, the wireless controller configuration engine 404 may mechanically adjust antenna(s) included on the peer-to-peer wireless controllers, adjust wireless signal strength or directionality of wireless communications, and/or otherwise direct the wireless communications to a peer-to-peer wireless controller on neighboring networking devices to allow the wireless communication to occur. As such, the networking device 218 may determine neighbor networking device information for networking devices in any of the racks 208-216 (as well as any other racks that are within a wireless communication range of the networking device 218). In other embodiments, the determination of neighbor networking device information may be performed using a peer-to-peer wireless controller on a networking device that does not have a line-of-sight with a peer-to-peer wireless controller on a neighboring networking device, but that may be coupled to an antenna that has a line-of-sight to a peer-to-peer wireless controller on a neighboring networking device (e.g., the antenna system 208a), or that may have a line-of-sight to an antenna that has a line-of-sight to a peer-to-peer wireless controller on a neighboring networking device (e.g., the antenna system 230). In different examples of that embodiment, the wireless controller configuration engine 404 may mechanically adjust the antenna system, adjust wireless signal strength or directionality of wireless communications, and/or otherwise direct the wireless communications to a peer-to-peer wireless controller on neighboring networking devices to allow the wireless communication to occur. As such, the networking device 218 may determine neighbor networking device information for networking devices in any of the racks 208-216 (as well as any other racks that are within a wireless communication range of the networking device 218).

In some embodiments, one or more networking devices may include one or more peer-to-peer wireless controllers that are configurable to provide "pass-through" communications. For example, with reference to the networking device 400 illustrated in FIG. 4, the peer-to-peer wireless controllers 406a and 408a may be configured to provide pass-through communications by the peer-to-peer wireless controller 406a receiving a wireless communication from another peer-to-peer wireless controller, and providing that wireless communication to the peer-to-peer wireless controller 408a for transmission onward to another peer-to-peer wireless controller without performing any actions on the wireless communication other than those necessary to allow that wireless communication to pass-through the networking device to reach another networking device. As such, with reference to FIG. 2, the networking device in the rack 208 may have peer-to-peer wireless controller(s) configured as pass-through wireless controllers, and may advertise the pass-through wireless controller(s) to the networking device 218 such that a peer-to-peer wireless controller on the networking device 218 (e.g., the peer-to-peer wireless controller 218a) may communicate (e.g., via a dedicated link) with a peer-to-peer wireless controller on the networking device in the rack 210. Thus, in some embodiments, at block 602 a networking device may determine neighbor networking device information for a networking device that is reachable through a pass-through wireless controller on another networking device. While a specific example of a two peer-to-peer wireless controller pass-through has been described, single peer-to-peer wireless controllers may provide a pass-through (either by themselves or with the use of an antenna system (e.g., the antenna system 230), and more peer-to-peer wireless controllers may provide a pass-through while remaining within the scope of the present disclosure.

Figure 7:
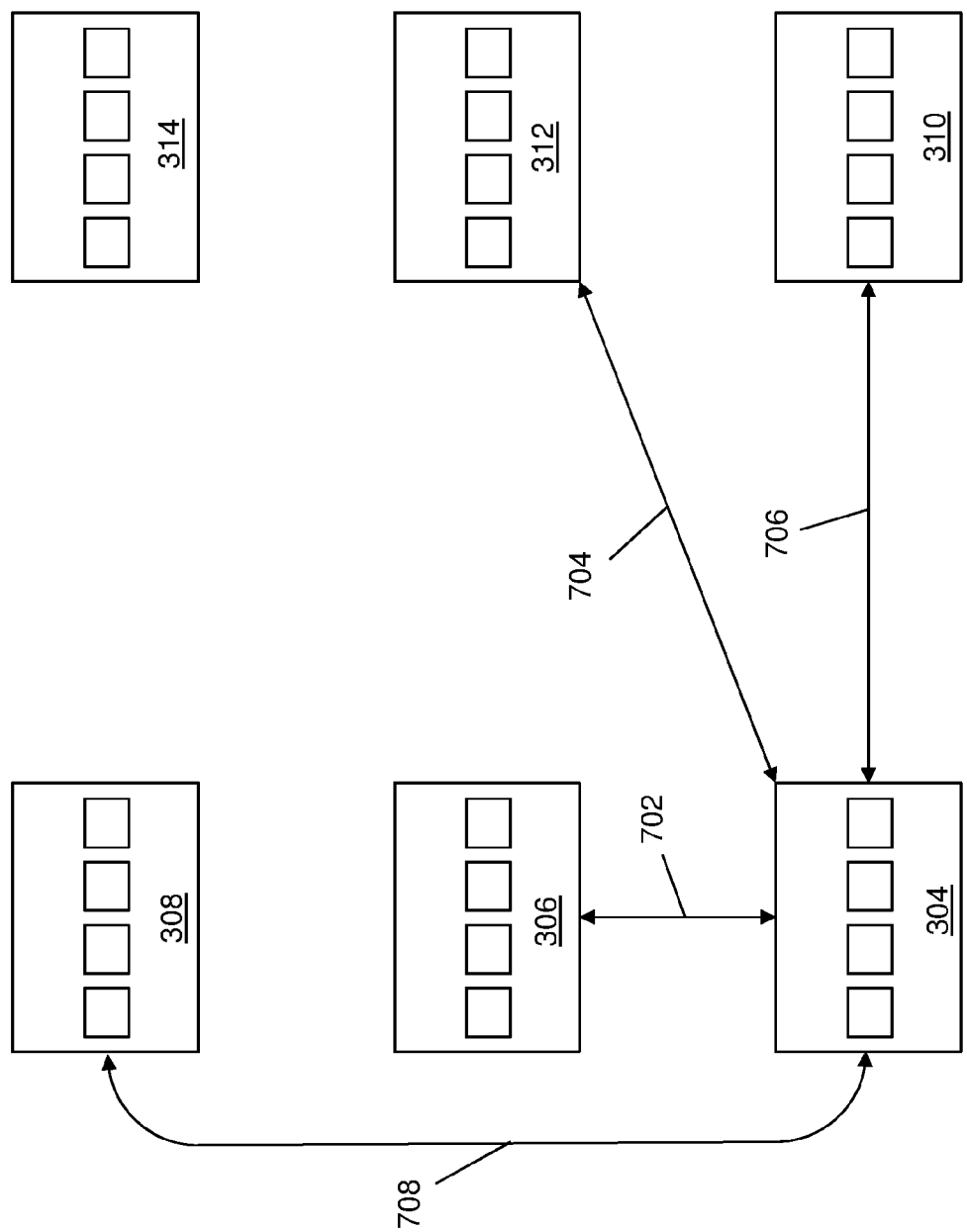
FIG. 7 is a schematic view illustrating a determination by a networking device of neighboring networking devices.

Referring now to FIG. 7, a specific example of block 602 is illustrated that shows the collection of neighbor networking device information by the networking device 304 (which may be the networking device 218 in FIG. 2) from networking devices 306, 308, 310, and 312, but not networking device 314 (which may correspond to the networking devices in the racks 208, 210, 212, 214, and 216, respectively). As can be seen, wireless communications 702, which may be provided by line-of-sight communications between any of the peer-to-peer wireless controllers on the networking devices 304 and 306, allow for the determination by the networking device 304 of neighbor networking device information for the networking device 306. Similarly, wireless communications 704, which may be provided by line-of-sight communications enabled by antenna and/or wireless signal strength/directionality configuration between peer-to-peer wireless controllers on the networking devices 304 and 312, allow for the determination by the networking device 304 of neighbor networking device information for the networking device 312. Similarly, wireless communications 706, which may be provided by wireless communications enabled by antenna systems (e.g., on the top of respective racks) coupled to peer-to-peer wireless controllers on the networking devices 304 and 310, allow for the determination by the networking device 304 of neighbor networking device information for the networking device 310. Similarly, wireless communications 708, which may be provided by wireless communications enabled by antenna systems (e.g., the antenna system 230 coupled to the wall 202), or via a pass-through wireless controller (e.g., on the networking device 306), allow for the determination by the networking device 304 of neighbor networking device information for the networking device 308.

Thus, at block 602 each of the networking devices may determine neighbor networking device information for networking devices that are within a desired proximity, and may communicate that neighbor networking device information to the management subsystem via the network 302. As discussed above, the network 302 may be an out-of-band management network that allows for the provisioning of the neighbor networking device information to the management subsystem 312 without effecting communications or other operations of the network. The neighbor networking device information may be provided to the management subsystem 312 in any of a variety of formats including, for example, as a calculated or estimated distance and direction, as directionality and signal strength data associated with each of the plurality of networking devices, and/or in any other format that may be utilized to determine the relative locations of each of the networking devices as discussed below. While some specific examples have been provided, one of skill in the art in possession of the present disclosure will recognize that the determination of proximate networking devices, the criteria for networking device that will be considered proximate a networking device, and the provisioning of neighbor networking device information may be performed in a variety of manners that will remain within the scope of the present disclosure.

The method 600 then proceeds to block 604 where the management subsystem determines relative locations of the networking devices. Block 604 of the method 600 may be considered a first portion of a Dynamic Wireless Topology Protocol (DWTP), conceived of by the inventors of the present disclosure, that is performed by the management subsystem. In an embodiment, the topology provisioning engine 504 in the management subsystem 500 receives the neighbor networking device information sent by each of the networking devices at block 602 through the communication system 506, and uses that neighbor networking device information to determine relative locations for each of the plurality of networking devices. For example, the topology provisioning engine 504 may use calculated or estimated distances and directions for each networking device as received at block 602, or use directionality and signal strength data to determine such distance and directionality for each networking device, to determine a physical topology of the networking devices that includes the relative locations of each of the networking devices. In other embodiments, the topology provisioning engine may use the Open Shortest Path First (OSPF) protocol, the Intermediate System to Intermediate System (ISIS) protocol, and/or other distributed link-state-vector based protocols to discover or otherwise determine relative distance and directionality of each of the networking devices in the system. Thus, utilizing the neighbor networking device information received at block 602, at block 604 the management subsystem 312/500 determines the relative locations of each of the networking devices and stores that information in a location graph, networking device physical topology, or any other format or data structure provided in the topology provisioning database 508.

The method 600 then proceeds to block 606 where the management subsystem determines a number of peer-to-peer wireless controllers in each of the networking devices. Block 606 of the method 600 may be considered a second portion of the DWTP that is performed by the management subsystem. At block 606, the topology provisioning engine 504 may retrieve peer-to-peer wireless controller information from each of the networking devices in the system and use that peer-to-peer wireless controller information to determine a number of peer-to-peer wireless controllers included in, active in, or otherwise available on each of the networking devices. In some embodiments, the peer-to-peer wireless controller information may include information about whether peer-to-peer wireless controller(s) are available as pass-through wireless controllers (discussed above), as well as any other information known in the art about the peer-to-peer wireless controllers. In some embodiments, the peer-to-peer wireless controller information may be provided by the network devices to the management subsystem prior to the method 600 and it may be stored in the topology provisioning database 508. In other embodiments, the peer-to-peer wireless controller information may be provided by each of the networking devices to the management subsystem at block 602 along with the neighbor networking device information. In yet other embodiment, the peer-to-peer wireless controller information may be provided by each of the networking devices to the management subsystem subsequent to the management subsystem determining the relative locations of the networking devices at block 604. While a few examples have been provided, the determination of the number of peer-to-peer wireless controllers in each of the networking device may be performed in a variety of manners that will fall within the scope of the present disclosure. As discussed below, the relative locations of the networking devices and the number of peer-to-peer wireless controllers in each networking device provide the management subsystem the ability to discover the peering possibilities available between pairs of the plurality of peer-to-peer wireless controllers that are available in the networking devices in the system.

The method 600 then proceeds to block 608 where the management subsystem generates a peer-to-peer wireless controller topology. Block 608 of the method 600 may be considered a third portion of the DWTP that is performed by the management subsystem. In an embodiment, the topology provisioning engine 504 may then retrieve a variety of information from the topology provisioning database 508 and use that information in order to determine a peer-to-peer wireless controller topology. For example, the topology provisioning engine 504 may retrieve a maximum hop constraint from the topology provisioning database 508 that indicates a maximum number of hops that should be allowed between devices (e.g., in different racks) that are communicating with each other. In another example, the topology provisioning engine 504 may retrieve a minimum bandwidth constraint from the topology provisioning database 508 that indicates a minimum bandwidth desired for all of paired peer-to-peer wireless controllers in particular networking device. In another example, the topology provisioning engine 504 may retrieve a common number of peer-to-peer wireless controllers constraint from the topology provisioning database 508 that indicates a common number of available peer-to-peer wireless controllers in each of the networking devices should be utilized (e.g., a minimum number of peer-to-peer wireless controllers that are available in each of the networking devices). In another example, the topology provisioning engine 504 may retrieve an available pass-through wireless controller constraint from the topology provisioning database 508 that indicates the number of available pass-through wireless controllers available in each of the networking devices. In another example, the topology provisioning engine 504 may retrieve a bit-error-rate constraint from the topology provisioning database 508 that indicates the a maximum bit-error-rate allowable in communications between the networking devices.

Figure 8:
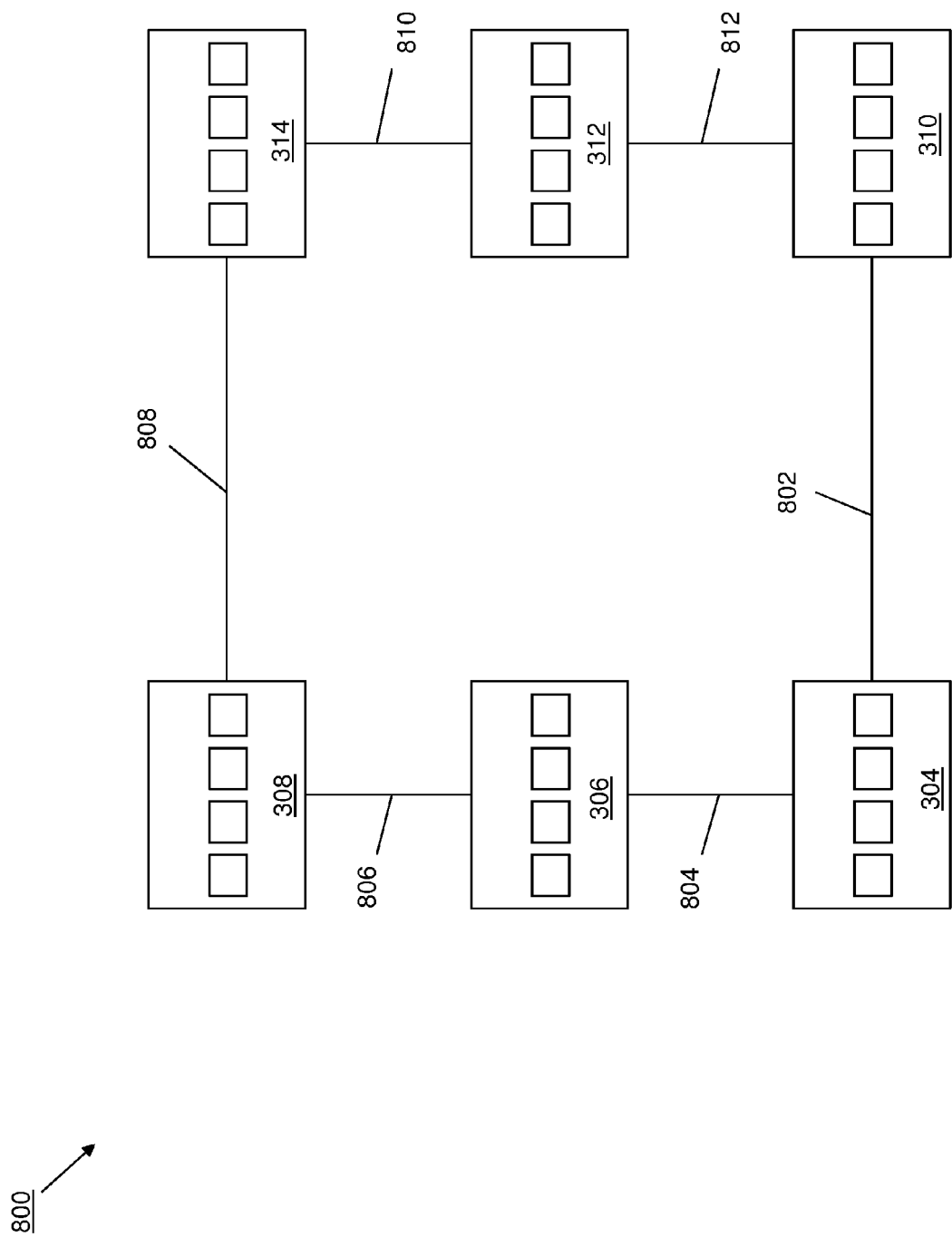
FIG. 8 is a schematic view illustrating a peer-to-peer wireless controller topology determined for the peer-to-peer wireless controller topology provisioning system of FIGS. 2 and 3 using a two peer-to-peer wireless controller constraint.

The topology provisioning engine 504 may then perform a "Constraint-based Shortest Path Forwarding" (CSPF) protocol, developed by the inventors of the present disclosure, that utilizes the relative locations of the networking device/networking device physical topology discussed above, along with the information retrieved from the topology provisioning database 508, to generate the peer-to-peer wireless controller topology. For example, FIG. 8 illustrates a simplified example of a peer-to-peer wireless controller topology 800 that was determined using a common number of peer-to-peer wireless controller constraint of two peer-to-peer wireless controllers per networking device. As can be seen, the two peer-to-peer wireless controller constraint provides the peer-to-peer wireless controller topology 800 with two wireless links (e.g., that will be provided by the two available peer-to-peer wireless controllers on each networking device 304-314) utilized by each networking device. For example, the networking device 304 includes a wireless link 802 to the networking device 310 (a portion of which is to be provided by a dedicated peer-to-peer wireless controller on the networking device 304), and a wireless link 804 to the networking device 306 (a portion of which is to be provided by a dedicated peer-to-peer wireless controller on the networking device 304). Similarly, the networking device 306 includes the wireless link 804 to the networking device 304 (a portion of which is to be provided by a dedicated peer-to-peer wireless controller on the networking device 306), and a wireless link 806 to the networking device 308 (a portion of which is to be provided by a dedicated peer-to-peer wireless controller on the networking devices 306).

Similarly, the networking device 308 includes the wireless link 806 to the networking device 306 (a portion of which is to be provided by a dedicated peer-to-peer wireless controller on the networking device 308), and a wireless link 808 to the networking device 314 (a portion of which is to be provided by a dedicated peer-to-peer wireless controller on the networking devices 308). Similarly, the networking device 314 includes the wireless link 808 to the networking device 308 (a portion of which is to be provided by a dedicated peer-to-peer wireless controller on the networking device 314), and a wireless link 810 to the networking device 312 (a portion of which is to be provided by a dedicated peer-to-peer wireless controller on the networking devices 314). Similarly, the networking device 312 includes the wireless link 810 to the networking device 314 (a portion of which is to be provided by a dedicated peer-to-peer wireless controller on the networking device 312), and a wireless link 812 to the networking device 310 (a portion of which is to be provided by a dedicated peer-to-peer wireless controller on the networking devices 312). Similarly, the networking device 310 includes the wireless link 812 to the networking device 312 (a portion of which is to be provided by a dedicated peer-to-peer wireless controller on the networking device 310), and the wireless link 802 to the networking device 304 (a portion of which is to be provided by a dedicated peer-to-peer wireless controller on the networking devices 310).

Figure 9:
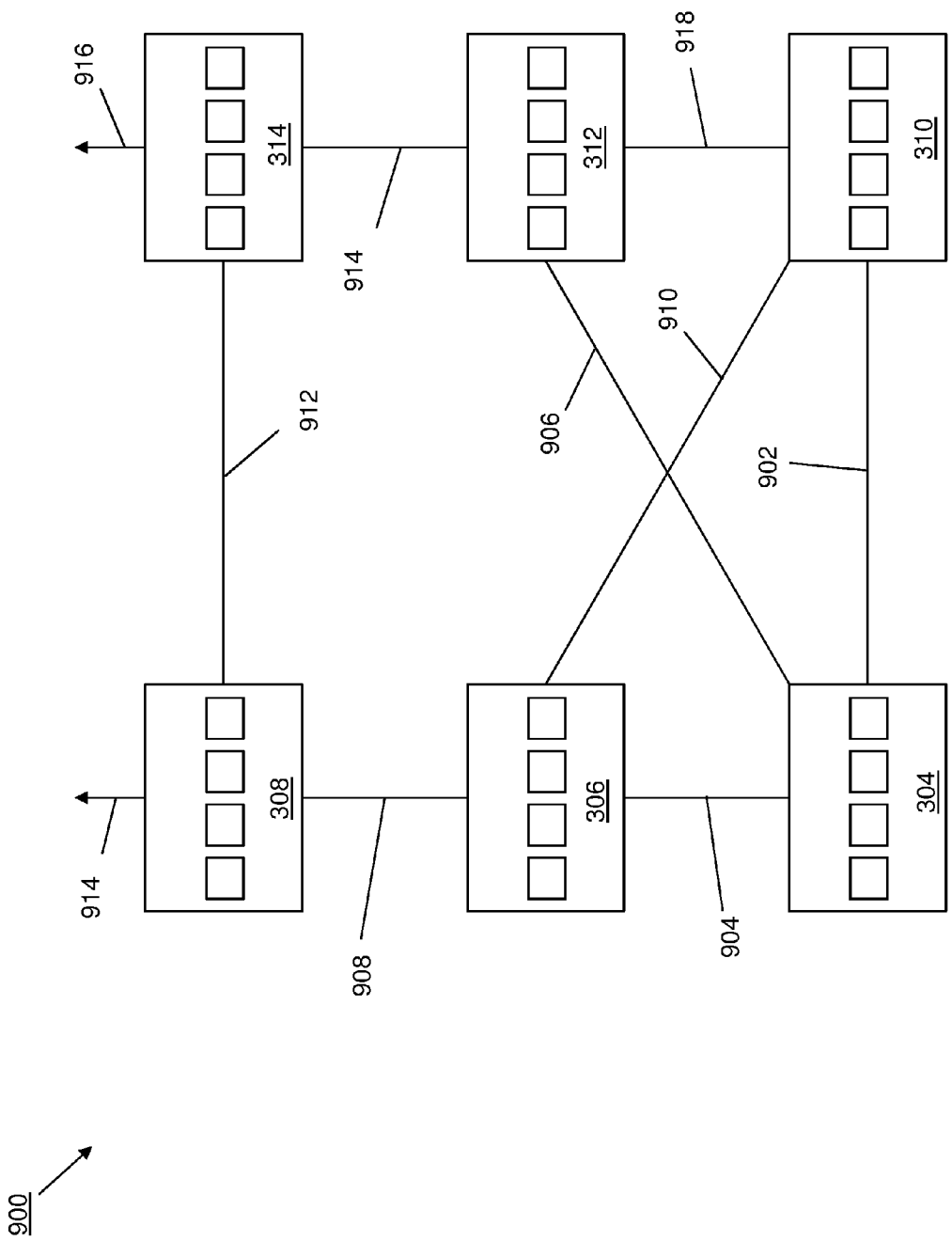
FIG. 9 is a schematic view illustrating a peer-to-peer wireless controller topology determined for the peer-to-peer wireless controller topology provisioning system of FIGS. 2 and 3 using a three peer-to-peer wireless controller constraint.

FIG. 9 illustrates a simplified example of a peer-to-peer wireless controller topology 900 that was determined using a common number of peer-to-peer wireless controller constraint of three peer-to-peer wireless controllers. As can be seen, the three peer-to-peer wireless controller constraint provides the peer-to-peer wireless controller topology 900 with three wireless links (e.g., that will be provided by the three available peer-to-peer wireless controllers on each networking device 304-314) utilized by each networking device. For example, the networking device 304 includes a wireless link 902 to the networking device 310 (a portion of which is to be provided by a dedicated peer-to-peer wireless controller on the networking device 304), a wireless link 904 to the networking device 306 (a portion of which is to be provided by a dedicated peer-to-peer wireless controller on the networking device 304), and a wireless link 906 to the networking device 312 (a portion of which is to be provided by a dedicated peer-to-peer wireless controller on the networking device 304). Similarly, the networking device 306 includes the wireless link 904 to the networking device 304 (a portion of which is to be provided by a dedicated peer-to-peer wireless controller on the networking device 306), a wireless link 908 to the networking device 308 (a portion of which is to be provided by a dedicated peer-to-peer wireless controller on the networking device 306), and a wireless link 910 to the networking device 310 (a portion of which is to be provided by a dedicated peer-to-peer wireless controller on the networking device 306).

Similarly, the networking device 308 includes the wireless link 908 to the networking device 306 (a portion of which is to be provided by a dedicated peer-to-peer wireless controller on the networking device 308), a wireless link 912 to the networking device 314 (a portion of which is to be provided by a dedicated peer-to-peer wireless controller on the networking device 308), and a wireless link 914 to a networking device that is not illustrated in FIG. 9 (a portion of which is to be provided by a dedicated peer-to-peer wireless controller on the networking device 308). Similarly, the networking device 314 includes the wireless link 912 to the networking device 308 (a portion of which is to be provided by a dedicated peer-to-peer wireless controller on the networking device 314), a wireless link 914 to the networking device 312 (a portion of which is to be provided by a dedicated peer-to-peer wireless controller on the networking device 314), and a wireless link 916 to a networking device that is not illustrated in FIG. 9 (a portion of which is to be provided by a dedicated peer-to-peer wireless controller on the networking device 314). Similarly, the networking device 312 includes the wireless link 914 to the networking device 314 (a portion of which is to be provided by a dedicated peer-to-peer wireless controller on the networking device 312), the wireless link 906 to the networking device 304 (a portion of which is to be provided by a dedicated peer-to-peer wireless controller on the networking device 312), and a wireless link 918 to the networking device 310 (a portion of which is to be provided by a dedicated peer-to-peer wireless controller on the networking device 312). Similarly, the networking device 310 includes the wireless link 902 to the networking device 304 (a portion of which is to be provided by a dedicated peer-to-peer wireless controller on the networking device 310), the wireless link 910 to the networking device 36 (a portion of which is to be provided by a dedicated peer-to-peer wireless controller on the networking device 310), and the wireless link 918 to the networking device 312 (a portion of which is to be provided by a dedicated peer-to-peer wireless controller on the networking device 310

While two examples of have been illustrated and described for peer-to-peer wireless controller topology using a common number of peer-to-peer wireless controller constraint, one of skill in the art in possession of the present disclosure will recognize how a maximum hop constraint, a minimum bandwidth constraint, a bit-error-rate constraint, and/or other constraints may be utilized, by themselves or in combinations, to create peer-to-peer wireless controller topologies that may be much more complicated than those illustrated in FIGS. 8 and 9. For example, maximum hop constraints may result in peer-to-peer wireless controller topologies that result in a limited number of links (according to the maximum number of hops) that may exist between any servers or racks that must communicate with a minimum latency. Similarly, minimum bandwidth constraints may result in peer-to-peer wireless controller topologies that provide links that provide no less than a minimum bandwidth between any two networking devices (e.g., a minimum bandwidth may be associated with a single link provided in part by a peer-to-peer wireless controller on a networking device, a minimum bandwidth may be associated with the sum of the links provided by the available peer-to-peer wireless controllers on a networking device, etc.). Furthermore, minimum bandwidth constraints may be satisfied by the topology provisioning engine 504 utilizing all (or as many as possible) of the available peer-to-peer wireless controllers in the system (e.g., given considerations such as maximum distance constraints associated with the transmission limits of the peer-to-peer wireless controllers) to provide a system-wide minimum bandwidth enabled by the peer-to-peer wireless controller topology. As such, while not illustrated explicitly, one of skill in the art in possession of the present disclosure will recognize how the topology provisioning engine 504 may utilize the constraints taught herein to generate peer-to-peer wireless controller topologies for any types and combinations of constraints in order to provide desired characteristics in a wireless network provided using a plurality of the peer-to-peer wireless controllers.

The method then proceeds to block 610 where the management subsystem provides the peer-to-peer wireless controller topology to the networking devices to cause the networking devices to configure their peer-to-peer wireless controllers to provide wireless links. In an embodiment, the topology provisioning engine 504 may send the peer-to-peer wireless controller topology generated at block 608 through the communication system 506 and via the network 302 to each of the networking devices such that it is received by the wireless controller configuration engines 404 in each of those networking devices. In response to receiving the peer-to-peer wireless controller topology, the wireless controller configuration engine 404 in each networking device will operate to configure its peer-to-peer wireless controllers to provide wireless links according to the peer-to-peer wireless controller topology. For example, at block 610, the wireless controller configuration engine 404 may operate to control any or all of the peer-to-peer wireless controllers 406*a-d* and 408*a-d*, the antennas including on those peer-to-peer wireless controllers, and/or the antennas coupled to those peer-to-peer wireless controllers (e.g., through the antenna system connector(s) 416) in order to create the wireless links in the peer-to-peer wireless controller topology. As such, for any wireless link in the peer-to-peer wireless controller topology, two networking devices may configure respective peer-to-peer wireless controllers, associated antennas, and/or other components, to establish that wireless link. In specific examples, such configurations may include performing wireless signal strength adjustments in the peer-to-peer wireless controllers, performing wireless signal directionality adjustments in the peer-to-peer wireless controllers and/or their antennas, performing mechanical antenna adjustments to direct or allow communications to reach a desired peer-to-peer wireless controller, and/or performing any other wireless link establishing actions known in the art. In addition, wireless controller configuration engines 404 in networking devices that include pass-through wireless controllers may configure peer-to-peer wireless controllers as pass-through wireless controllers to provide the pass-through functionality discussed above.

Figure 10:
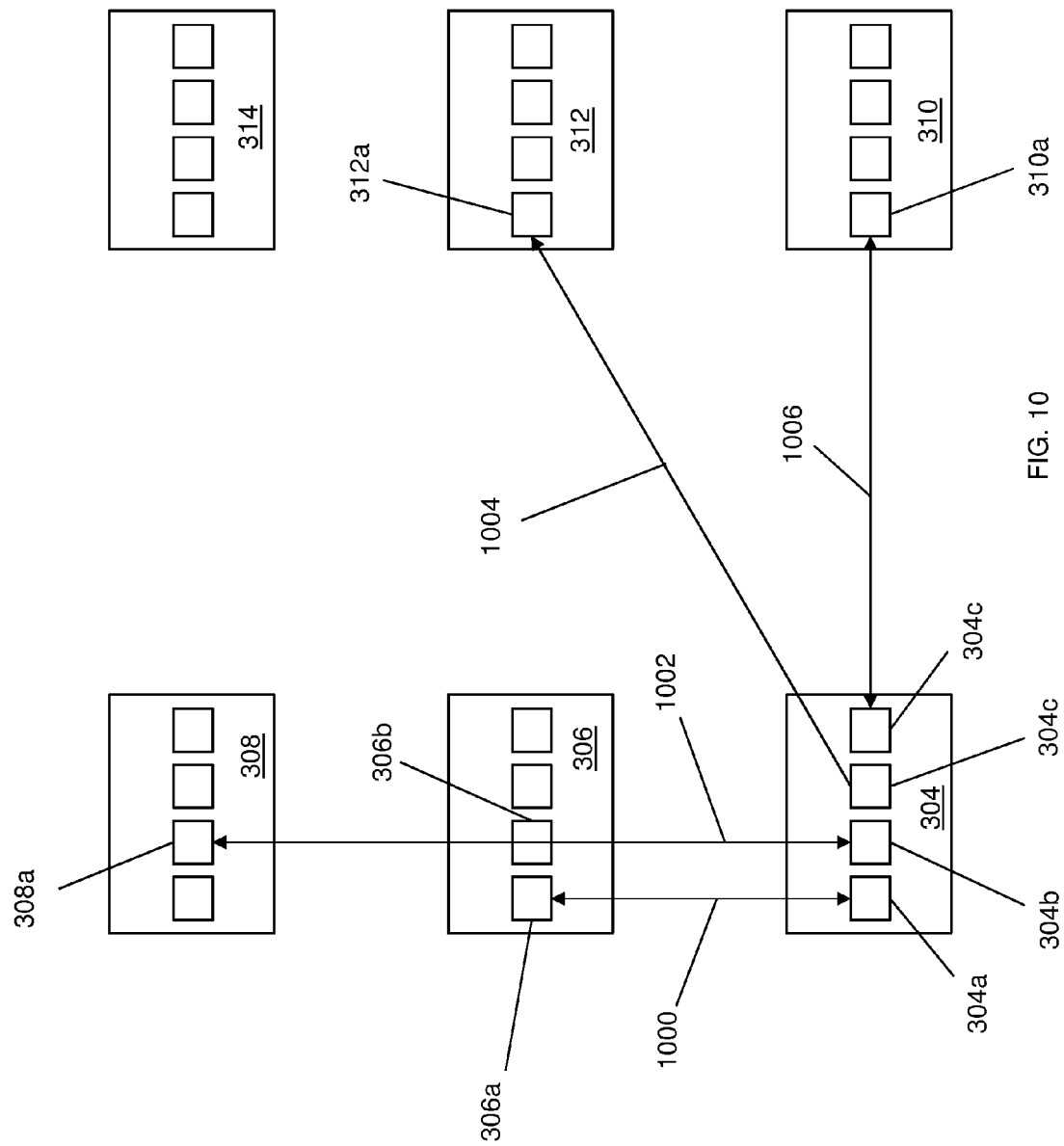
FIG. 10 is a schematic view illustrating an embodiment of the wireless links to a networking device that were established according to a peer-to-peer wireless controller topology.

Referring now to FIG. 10, an embodiment of wireless links resulting from networking devices configuring their peer-to-peer wireless controllers according to a peer-to-peer wireless controller topology is illustrated. While wireless links common to only a single networking device are illustrated, one of skill in the art in possession of the present disclosure will recognize that each of the networking devices may configure its peer-to-peer wireless controllers according to a peer-to-peer wireless controller topology in order to provide similar wireless links dictated by the peer-to-peer wireless controller topology. In the illustrated embodiment, a wireless link 1000 has been provided by the networking device 304 configuring its peer-to-peer wireless controller 304*a* to control a portion of the wireless link 1000, and the networking device 306 configuring its peer-to-peer wireless controller 306*a* to control a portion of the wireless link 1000. Similarly, a wireless link 1002 has been provided by the networking device 304 configuring its peer-to-peer wireless controller 304*b* to control a portion of the wireless link 1002, the networking device 306 configuring at least one of its peer-to-peer wireless controllers 306*b* to operate as a pass-through wireless controller, and the networking device 308 configuring its peer-to-peer wireless controller 308*a* to control a portion of the wireless link 1002. Similarly, a wireless link 1004 has been provided by the networking device 304 configuring its peer-to-peer wireless controller 304*c* to control a portion of the wireless link 1004, and the networking device 312 configuring its peer-to-peer wireless controller 312*a* to control a portion of the wireless link 1004. Similarly, a wireless link 1006 has been provided by the networking device 304 configuring its peer-to-peer wireless controller 304*d* to control a portion of the wireless link 1006, and the networking device 310 configuring its peer-to-peer wireless controller 310*a* to control a portion of the wireless link 1006. As discussed above, the configuration of antennas and antennas systems may also be performed to provide any of the wireless links 1000, 1002, 1004, and/or 1006.

While a specific configuration according to a peer-to-peer wireless controller topology has been illustrated, that configuration may change in response to changes in the network. For examples, as links are added to or removed from the system such as, for example, in response to the addition or removal of networking devices, the method may be repeated to redetermine the peer-to-peer wireless controller topology. Furthermore, such redeterminations may be performed in an incremental fashion on portions of the system in order to minimize the changes to a previously generated and distributed peer-to-peer wireless controller topology. As such, the topology provisioning engine 504 may be configured to detect the addition to or removal of peer-to-peer wireless controllers in the system, determine the associated removal of or availability of links, and then determine the minimum changes to the peer-to-peer wireless controller topology that will incorporate those links changes while satisfying the constraints provided for the peer-to-peer wireless controller topology.

Thus, systems and methods have been described that utilize configurable peer-to-peer wireless controllers to provide a configurable L1 topology that is constructed based on constraints such as hop count and bandwidth to provide a dynamic, low-latency, high bandwidth wireless network. Such wireless networks may be implemented in datacenters in order to remove the cabling that is conventionally required for communication between data center devices while still providing high bandwidth, low latency communications between those devices.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A peer-to-peer wireless controller topology provisioning system, comprising:
    a plurality of networking devices that each include a plurality of peer-to-peer wireless controllers that are each configured to control a portion of a single wireless link with another peer-to-peer wireless controller; and
    a management subsystem that is coupled to each of the plurality of networking devices, wherein the management subsystem is configured to:
        determine relative locations for each of the plurality of networking devices;
        determine a number of peer-to-peer wireless controllers available in each of the plurality of networking devices;
        generate a peer-to-peer wireless controller topology for at least some of the peer-to-peer wireless controllers that are available in the plurality of networking devices based on both the relative locations for each of the plurality of networking devices and the number of peer-to-peer wireless controllers available in each of the plurality of networking devices, and using a maximum hop constraint and a minimum bandwidth constraint; and
        provide the peer-to-peer wireless controller topology to each of the plurality of networking devices, wherein each of the plurality of networking devices is configured to configure their available peer-to-peer wireless controllers to provide wireless links according to the peer-to-peer wireless controller topology.

2. The peer-to-peer wireless controller topology provisioning system of claim 1, wherein the peer-to-peer wireless controllers that are available in the plurality of networking devices include at least one wireless controller that is available as a pass-through wireless controller, and wherein management system is configured to:
    generate the peer-to-peer wireless controller topology that includes a first wireless link that is provided between two of the peer-to-peer wireless controllers that are available in the plurality networking devices and that passes through the pass-through wireless controller.

3. The peer-to-peer wireless controller topology provisioning system of claim 1, wherein the management subsystem is configured to:
    determine a common number of wireless controllers available in each of the plurality of networking devices, wherein the peer-to-peer wireless controller topology is determined using the common number of wireless controllers available in each of the plurality of networking devices.

4. The peer-to-peer wireless controller topology provisioning system of claim 1, wherein each of the plurality of networking devices is configured to:
    connect to at least one neighbor networking device of the plurality of networking devices; and
    provide neighbor networking device information to the management subsystem that is based on the connections to the at least one neighbor networking device, wherein the management subsystem is configured to determine the relative locations for each of the plurality of networking devices using the neighbor networking device information.

5. The peer-to-peer wireless controller topology provisioning system of claim 1, wherein the minimum bandwidth constraint includes a minimum bandwidth required for all of the wireless links provided between the peer-to-peer wireless controllers.

6. The peer-to-peer wireless controller topology provisioning system of claim 1, wherein management subsystem is coupled to each of the plurality of networking devices through an out-of-band management network.

7. The peer-to-peer wireless controller topology provisioning system of claim 1, wherein the wireless controller topology is configured to cause at least one of the plurality of networking devices to configure their available peer-to-peer wireless controllers by performing at least one of a wireless signal strength adjustment, a wireless signal directionality adjustment, and a mechanical antenna adjustment.

8. An information handling system (IHS), comprising:
    a communication system;
    a processing system that is coupled to the communication system; and
    a memory system that is coupled to the processing system and that includes instruction that, when executed by the processing system, cause the processing system to provide a topology provisioning engine that is configured to:
        determine relative locations for each of a plurality of networking devices that are coupled to the communication system;
        determine a number of peer-to-peer wireless controllers available in each of the plurality of networking devices, wherein each of the peer-to-peer wireless controllers are configured to control a portion of a single wireless link with another peer-to-peer wireless controller;
        generate a peer-to-peer wireless controller topology for at least some of the peer-to-peer wireless controllers that are available in the plurality of networking devices based on both the relative locations for each of the plurality of networking devices and the number of peer-to-peer wireless controllers available in each of the plurality of networking devices, and using a maximum hop constraint and a minimum bandwidth constraint; and
        provide the peer-to-peer wireless controller topology through the communication system to each of the plurality of networking devices, wherein wireless topology is configured to cause each of the plurality of networking devices to configure their available peer-to-peer wireless controllers to provide wireless links according to the peer-to-peer wireless controller topology.

9. The IHS of claim 8, wherein the peer-to-peer wireless controllers that are available in the plurality of networking devices include at least one wireless controller that is available as a pass-through wireless controller, and wherein topology provisioning engine is configured to:
    generate the peer-to-peer wireless controller topology that includes a first wireless link that is provided between two of the peer-to-peer wireless controllers that are available in the plurality of networking devices and that passes through the pass-through wireless controller.

10. The IHS of claim 8, wherein the topology provisioning engine is configured to:
  determine a common number of wireless controllers available in each of the plurality of networking devices, wherein the peer-to-peer wireless controller topology is determined using the common number of wireless controllers available in each of the plurality of networking devices.

11. The IHS of claim 8, wherein the minimum bandwidth constraint includes a minimum bandwidth required for all of the wireless links provided between the peer-to-peer wireless controllers.

12. The IHS of claim 8, wherein communication system is coupled to each of the plurality of networking devices through an out-of-band management network.

13. The IHS of claim 8, wherein the wireless topology is configured to cause at least one of the plurality of networking devices to configure their available peer-to-peer wireless controllers by performing at least one of a wireless signal strength adjustment, a wireless signal directionality adjustment, and a mechanical antenna adjustment.

14. A method for providing a peer-to-peer wireless controller topology, comprising:
  determining, by a management subsystem, relative locations for each of a plurality of networking devices;
  determining, by the management subsystem, a number of peer-to-peer wireless controllers available in each of the plurality of networking devices, wherein each of the peer-to-peer wireless controllers are configured to control a portion of a single wireless link with another peer-to-peer wireless controller;
  generating, by the management subsystem, a peer-to-peer wireless controller topology for at least some of the peer-to-peer wireless controllers that are available in the plurality of networking devices based on both the relative locations for each of the plurality of networking devices and the number of peer-to-peer wireless controllers available in each of the plurality of networking devices, and using a maximum hop constraint and a minimum bandwidth constraint; and
  providing, by the management subsystem, the peer-to-peer wireless controller topology through a communication system to each of the plurality of networking devices, wherein wireless topology is configured to cause each of the plurality of networking devices to configure their available peer-to-peer wireless controllers to provide wireless links according to the peer-to-peer wireless controller topology.

15. The method of claim 14, wherein the peer-to-peer wireless controllers that are available in the plurality of networking devices include at least one wireless controller that is available as a pass-through wireless controller, and wherein the method further comprises:
  generating, by the management subsystem, the peer-to-peer wireless controller topology that includes a first wireless link that is provided between two of the peer-to-peer wireless controllers that are available in the plurality of networking devices and that passes through the pass-through wireless controller.

16. The method of claim 14, further comprising:
  determining, by the management subsystem, a common number of wireless controllers available in each of the plurality of networking devices, wherein the peer-to-peer wireless controller topology is determined using the common number of wireless controllers available in each of the plurality of networking devices.

17. The method of claim 14, further comprising:
  connecting, by each of the plurality of networking devices, to at least one neighbor networking device of the plurality of networking devices; and
  providing, by each of the plurality networking devices, neighbor networking device information to the management subsystem that is based on the connections to the at least one neighbor networking device; and
  determining, by the management subsystem, the relative locations for each of the plurality of networking devices using the neighbor networking device information.

18. The method of claim 14, wherein the minimum bandwidth constraint includes a minimum bandwidth required for all of the wireless links provided between the peer-to-peer wireless controllers.

19. The method of claim 14, wherein management subsystem is coupled to each of the plurality of networking devices through an out-of-band management network.

20. The method of claim 14, further comprising:
  configuring, by each of the plurality of networking devices, their available peer-to-peer wireless controllers by performing at least one of a wireless signal strength adjustment, a wireless signal directionality adjustment, and a mechanical antenna adjustment.

* * * * *